United States Patent [19]

Magne

[11] Patent Number: 4,706,092
[45] Date of Patent: Nov. 10, 1987

[54] ARRANGEMENT FOR MEASURING VELOCITY WITH RESPECT TO A SURFACE

[75] Inventor: Francois Magne, Paris, France

[73] Assignee: U.S. Philips Corporation, New York, N.Y.

[21] Appl. No.: 836,918

[22] Filed: Mar. 6, 1986

[30] Foreign Application Priority Data

Mar. 29, 1985 [FR] France .................... 85 04823

[51] Int. Cl.$^4$ ............................................. G01S 13/58
[52] U.S. Cl. .................................. 342/109; 342/115; 342/120; 342/196
[58] Field of Search ................ 342/104, 105, 107–109, 342/112, 115, 116, 87, 89, 98–103, 120, 122, 123, 127, 145, 194–197

[56] References Cited

U.S. PATENT DOCUMENTS

| 3,588,899 | 6/1971 | Strauch | 342/87 |
| 4,302,758 | 11/1981 | Tomasi | 342/109 X |
| 4,426,647 | 1/1984 | Tomasi | 342/105 |

FOREIGN PATENT DOCUMENTS

2502340 3/1981 France .

Primary Examiner—T. H. Tubbesing
Assistant Examiner—Bernarr Earl Gregory
Attorney, Agent, or Firm—Robert J. Kraus

[57] ABSTRACT

This arrangement comprises a fixed frequency emitter circuit (10) for directing a wave (12) to a surface (2) by means of a transmission antenna (11), a receiver circuit (25) for receiving by means of at least one receiving antenna (23) the wave (12) returned by the surface, and a processing circuit (30) for processing the return wave and enabling production of an indication of the velocity. The processing circuit has two branches (50 and 54), a direct branch for applying the received signal to one input of a multiplying member (52), and a delaying branch for applying the received signal to the other input of the multiplying member after having produced a delay $t_0$ relative to the direct branch. A frequency estimating element (60) receives the multiplying member output signal and a calculation member (62) produces the indication of the velocity from the estimating member output signal and of the distance "h".

12 Claims, 25 Drawing Figures

ARRANGEMENT FOR MEASURING VELOCITY WITH RESPECT TO A SURFACE

BACKGROUND OF THE INVENTION

The invention relates to an arrangement for measuring the velocity with respect to a surface placed at some distance therefrom. The arrangement comprises a transmitting circuit for directing a wave towards that surface by means of a transmission antenna, a receiver circuit for receiving by means of at least one receiving antenna the wave returned from the surface, and a circuit for processing the returned wave for providing the indication of the velocity.

Such an arrangement is used with great advantage, more specifically in radio navigation for measuring the horizontal speed of an airplane in which the arrangement is installed, the relevant surface then being the ground. Further applications can be found in the textile industry where often, during manufacture, one needs to determine the rate of travel of a piece of fabric.

In Applicant's French Patent Specifications, published under Nos. 2,477,283 (corresponding to U.S. Pat. No. 4,426,647) and 2,502,340, rate measuring arrangements are described. In these known arrangements the receiving circuit includes two receiving antennas which are spaced apart by a certain distance and a correlation circuit for effecting the correlation between the signals pulled-in by the antennas, the maximum of the correlation then defining the speed.

SUMMARY OF THE INVENTION

The present invention has for its object to provide an arrangement of the type described in the opening paragraph having a simpler structure, for which one single receiving antenna is required and which incorporates a more efficient processing circuit.

To that end, an arrangement for measuring the rate of travel with respect of a surface is characterized in that the receiving circuit is associated with one single antenna for producing a receiving signal, in that the processing circuit has two branches, a direct branch for applying the received signal to an input of a multiplying member, and a delaying branch for applying the received signal to the other input of the multiplying member after having been subjected to a delay $t_0$ calculated relative to the direct branch. The processing circuit also includes a member for measuring the frequency of the multiplying member output signal and a calculating member for supplying the indication of the velocity from the estimation member output signal and of the distance. The emitter circuit is constituted by a fixed-frequency oscillator.

BRIEF DESCRIPTION OF THE DRAWING

The following description, given by way of non-limitative example with reference to the accompanying drawing figures, will make it better understood how the invention can be put into effect:

FIGS. 4a, 4b and 4c show possible structures for the direct and delaying branches.

DESCRIPTION OF THE PREFERRED EMBODIMENTS

Figure 1:
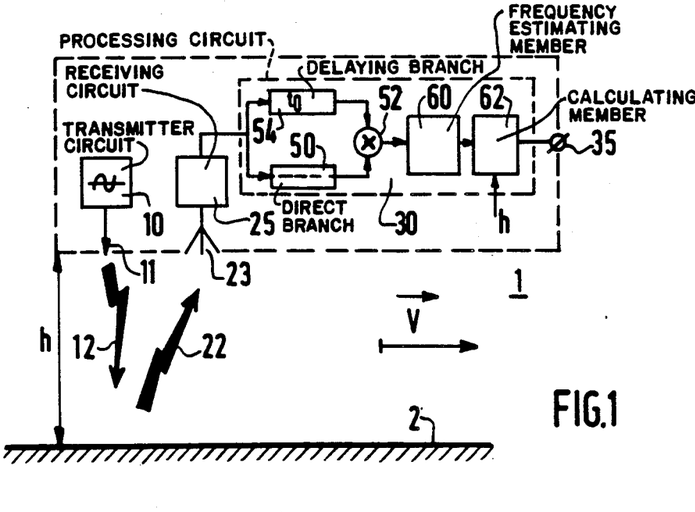
FIG. 1 shows an arrangement for measuring the rate of travel according to the invention.

In FIG. 1, reference numeral 1 denotes the arrangement which is the object of the invention, for measuring the rate of travel V. In the example described, the arrangement 1 moves relative to the surface 2. Consequently, the case will more specifically be considered in which the arrangement is aboard an airplane and one wants to measure the horizontal speed V of this airplane. The altitude relative to the ground 2 has the value "h". This value is determined by means which will be described in greater detail hereinafter.

The arrangement 1 comprises first of all a transmitter circuit 10 associated with an antenna 11 for transmitting a wave 12 towards the surface of the ground 2; this wave is reflected from the ground which, generally, behaves as a diffusing surface. This wave is pulled-in by the receiving antenna 23, is thereafter appropriately processed by the receiving circuit 25 for submitting it to a frequency change and is amplified. The subsequent processing circuit 30 supplies from a terminal 35 the indication of the speed V.

According to the invention, the receiving circuit is associated with one single antenna (antenna 23), the processing circuit 30 has two branches, one branch, the so-called direct branch denoted by reference numeral 50 is intended to apply the received signal available at the output of the receiving circuit 25 to a multiplier member 52; a second branch, the so-called delaying branch denoted by reference numeral 54 is intended to apply the same received signal to the other input of the multiplier member 52, after having produced a delay $t_0$ calculated relative to the direct branch. At the output of the multiplier member 52 a frequency estimating member 60 is provided, and finally, a calculating member 62 for supplying the velocity indication from the output signal of the estimating member 60 and the altitude "h"; the emitter circuit 10 is constituted by a fixed-frequency oscillator.

Figure 2:
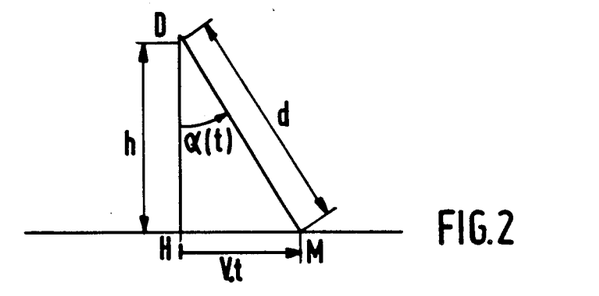
FIG. 2 is a diagram for showing certain parameters which are useful for explaining the mode of operation of the arrangement shown in FIG. 1.

The invention is based on the following considerations;

In FIG. 2, point D represents the location of an arrangement positioned at a height "h" perpendicularly to a point H of the surface 2. Now a reflection point M of the surface will be considered. This point is situated at a distance "d" from D. The transmitted wave E(t) in the point D has the frequency $f_0$ and can be written as:

$$E(t) = A \sin(2\pi f_0 \cdot t)$$

The received wave R(t) after having been reflected from point M is then written as:

$$R(t) = \sin\left[2\pi f_L \cdot \left(t - \frac{2d}{c}(t)\right) + \phi\right] \quad (1)$$

wherein $\phi$ is a constant,
wherein c is the velocity of light, and
wherein $f_L$ is the carrier frequency obtained after the frequency change in the receiver 25.

The multiplier member 52 produces a signal z(t), whilst disregarding the double frequency components:

$$z(t) = R(t) \cdot R(t - t_0) =$$

$$k\cos[2\pi f_L]\left[t_0 + \frac{2}{c}(d(t - t_0) - d(t))\right]$$

wherein k is a constant.

If the triangle DHM of FIG. 2 is considered, it is then possible to write, using the Pythagoras theorem:

$$d = \sqrt{h^2 + V^2 \cdot t^2}$$

If $\alpha(t)$ is assumed to be small:

$$d(t) \simeq h\left[1 + \frac{1}{2}\frac{V^2 t^2}{h^2} + \ldots\right] \quad (2)$$

and then $$d(t) - d(t - t_0) = \frac{V^2 t_0^2}{2h} - \frac{V^2 t_0}{h} + \ldots$$

this results in the expression z(t):

$$z(t) = k\cos\left[2\pi f_L\left(t_0 + \frac{V^2 t_0^2}{hc} - \frac{2V^2 t_0}{ch}t\right)\right] \quad (3)$$

$$= k\cos\left(-4\pi f_L \frac{V^2 t_0}{hc} \cdot t + 2\pi f_L t_0 + 2\pi f_L \frac{V^2 t_0^2}{hc}\right)$$

$$z(t) = k\cos[\Omega t + \phi]$$

By measuring $\Omega$ it is then possible to determine the velocity V.

$$V = \sqrt{\Omega \cdot \frac{hc}{4\pi f_L \cdot t_0}} \quad (4)$$

It is however sufficient to consider the case, which is closer to the actual situation, in which several reflectors (N) are present; the received wave is constituted by N superimposed waves of amplitude $a_i$ and is then written as:

$$R(t) = \sum_{i=1}^{N} a_i \sin 2\pi f_0 \cdot \left(t - \frac{2d_i(t)}{c} + \phi\right)$$

which results in $$z(t) = \sum_{i=1}^{N} \sum_{j=1}^{N} a_i(t) a_j(t - t_0) \times$$

$$\cos \cdot \left\{2\pi f_L \cdot \left[t_0 + \frac{2}{c}(d_j(t - t_0) - d_i(t))\right]\right\}$$

If it is assumed that the reflectors are randomly distributed over the ground, the contribution to the spectre of the signal z(t) by the differences $d_j - d_i$ (wherein $i \neq j$) is of a random nature, whilst the contribution of the differences $d_i(t - t_0) - d_i(t)$ structures the same frequency $\Omega$.

Figure 3A:
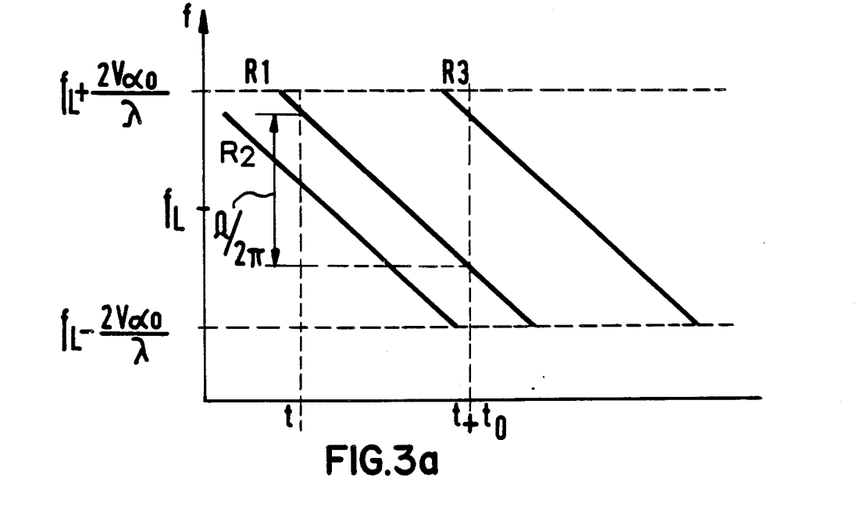
FIGS. 3a and 3b are diagrams for illustrating the mode of operation of the arrangement shown in FIG. 1.
Figure 3B:
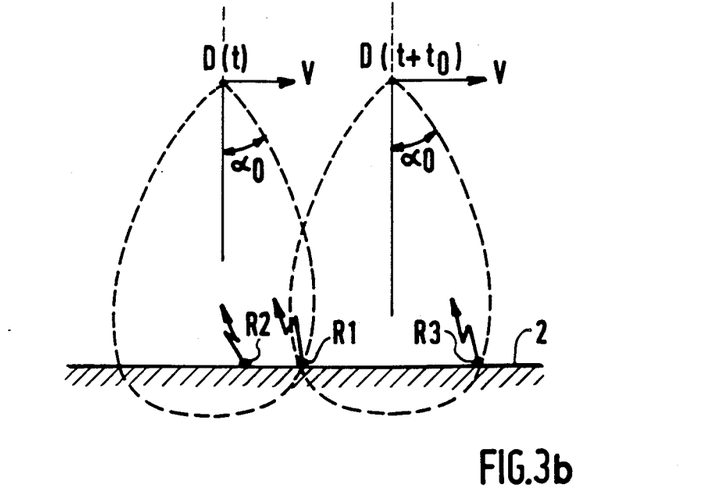

FIG. 3a shows as a function of the time the development of the frequency of the signal at the output of the receiving circuit 25. To simplify the representation, only three lines are illustrated relative to three diffusing points R1, R2 and R3 arranged on the ground 2 as indicated in FIG. 3b. Let it be assumed that the antenna 23 sees the surface 2 at an angle $\alpha_0$ situated on either side of the vertical, and corresponding to its radiation diagram. Thus, the frequency of the signal received at the output of the receiving circuit can only develop by a frequency extending from a value equal to $$f_L + \frac{2V\alpha_0}{\lambda}\right)$$

(wherein it is assumed that $\sin \alpha_o \sim \alpha_o$) to $$f_L - \frac{2V\alpha_0}{\lambda}.$$

This development is linear, as is shown by the relation (1) taking account of the relation (2).

In FIG. 3b the points D(t) and D(t+$t_0$) represent two locations of the arrangement 1 in accordance with the invention at instants separated by a duration $t_0$. Thus, at D(t) the diffusing points R1 and R2 are seen by the antenna 23 and at D(t+$t_0$) the points R2 and R3. Thus, the difference between the ordinates for each of the lines R1, R2 and R3 shown in FIG. 3a is always constant for differences between the abscissas equal to $t_0$: consequently, this value is $\Omega/2\pi$ (see formula (3)).

FIGS. 3a, 3b clearly show the contradicting requirements imposed on the value $t_0$. On the one hand, $t_0$ must be high to ensure that the error of $\Omega$ is low, but if an excessively high value $t_0$ is taken, it is no longer possible to see the same point and there is no correlation anymore between the signals at the output of the branches 50 and 54. The values to be chosen for $t_0$ will be described in the sequel.

Figures 4, 4A:
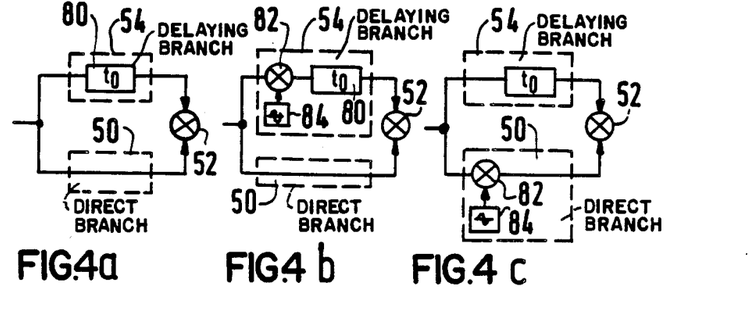

FIGS. 4a, 4b and 4c show the different manners of realizing the branches 50 and 54. In FIG. 4a the branch 54 is constituted by a delay line 80 which causes the required delay $t_0$, whilst the branch 50 is formed by a direct link. As the spectres of the signals are rather wide as regards their frequency and one wants to avoid the occurrence of parasitic signals due to unwanted beats of the several components of the spectrum, these beats being brought about more specifically by the non-linearities of the member 52, the spectrum of the signals of the retarding branch 54 are separated from the spectrum of the signals from the direct branch. To that end, a modulator 82 is used which cooperates with a shift oscillator 84 included either in the retarding branch 54 as shown in FIG. 4b, or in the direct branch as shown in FIG. 4c.

Figure 5:
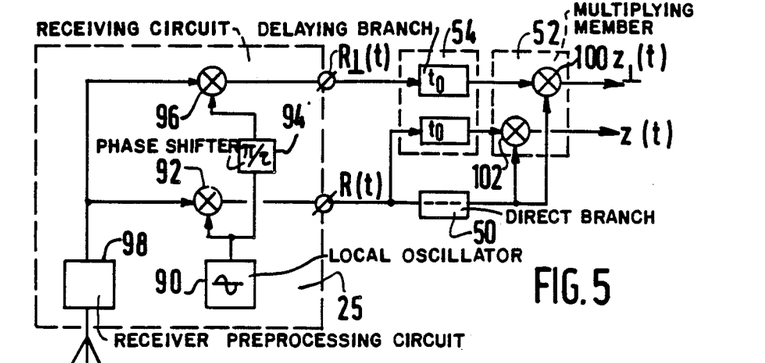
FIGS. 5, 6 and 7 show different manners of connecting the direct and delaying branches for quadrature signals.

FIG. 5 illustrates the case in which the receiving circuit 25 is of a type supplying two quadrature signals, that is to say two signals R(t) and R⊥(t) which can be written as:

$$R(t) = a\sin\left[2\pi f_L \cdot \left(t - \frac{2d(t)}{c}\right) + \phi\right]$$

$$R\perp(t) = a\cos\left[2\pi f_L \cdot \left(t - \frac{2d(t)}{c}\right) + \phi\right]$$

which can be obtained by means of a local oscillator 90 which applies its signals directly to a mixer 92 and also, via a π/2 phase shifter 94, to a further mixer 96, the mixers being, in addition, connected to the output of a receiver preprocessing circuit 98.

In this case the delaying branch 54 is a dual branch, so as to delay the signals R(t) and R⊥(t), whilst the direct branch is a single branch and renders it possible to transmit the signal R(t) directly to the multiplying member 52, which is here constituted by two multipliers 100 and 102. The multiplier 100 receives at its inputs the respective signals R⊥(t−t₀) and R(t) and the multiplier 102 receives the signals R(t−t₀) and R(t). They consequently produce the signals z(t) and z⊥(t), respectively;

$$z(t) = k\cos(\Omega t + \phi)$$

$$z\perp(t) = k\sin(\Omega t + \phi)$$

The quadrature signals allow an improved processing operation to determine Ω.

Figure 6:
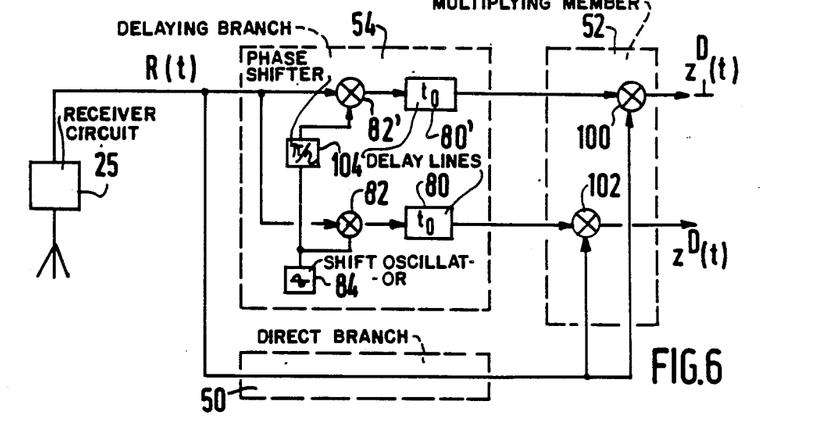
Figure 7:
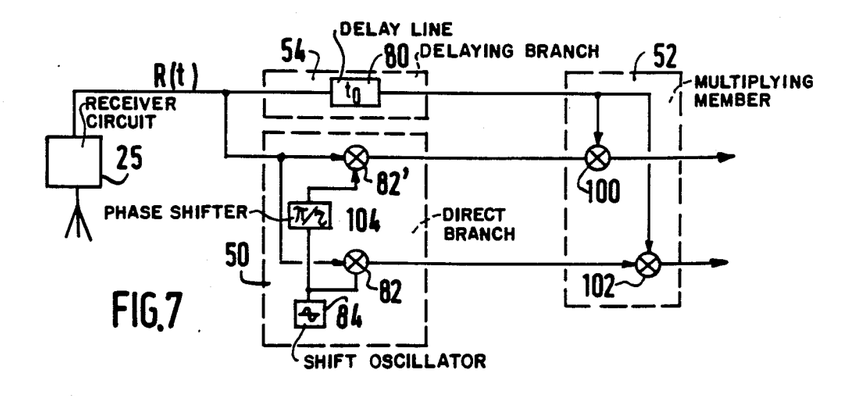

The signals z(t) and z⊥(t) can be processed in a different manner, shown in FIG. 6.

The signal R(t) coming from the receiver circuit 25 is applied to the direct branch 50 and also to the delaying branch 54 of the type shown in FIG. 4b, comprising a shift oscillator 84. Here, a phase shifter 104, which is connected to an additional modulator 82' and whose output is connected to a delay line 80', is connected to this oscillator 84. The outputs of the delay lines 80 and 80' are connected to inputs of the multipliers 102 and 100, the other inputs of these multipliers receiving the signal R(t). It should be noted here that the signals $z^D\perp(t)$ and $z^D(t)$ produced by the assembly of FIG. 6 differ from the signals z⊥(t) and z(t);

$$z^D\perp(t) = k\sin[(\Omega+\omega)t+\phi]$$

$$z^D(t) = k\cos[(\Omega+\omega)t+\phi]$$

a constant ω being introduced to define the influence of the frequency shift caused by the oscillator 84.

It is obvious that the assembly of the components 82, 82', 84 and 104 can be arranged in the direct band, whilst the delaying branch comprises only one single delay line 80 to whose output one of the two inputs of the multipliers 100 and 102 is connected, the outputs of the modulators 82 and 82' being connected directly to the other input of the members 100 and 102, respectively.

Figure 8:
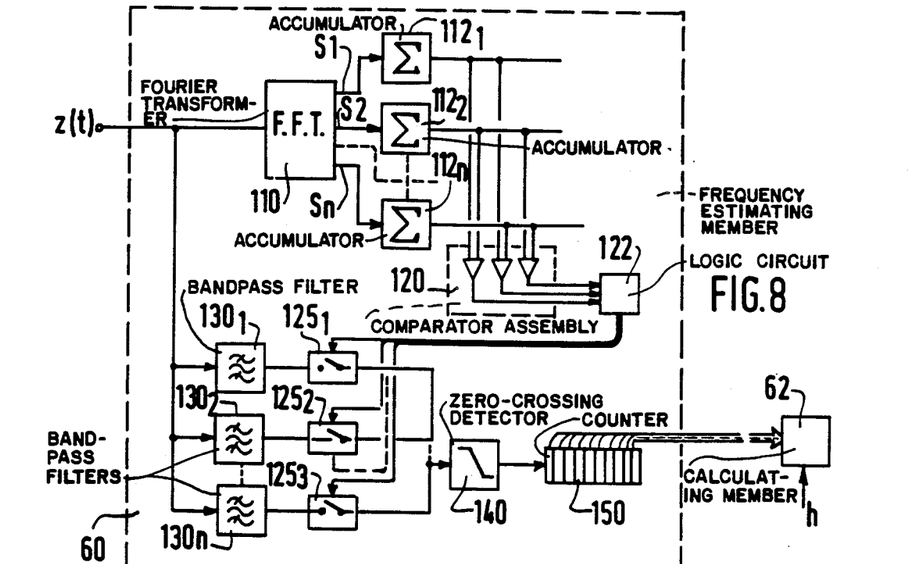
FIGS. 8, 9 and 10 show embodiments of the frequency-estimating member.

FIG. 8 illustrates a first embodiment of a frequency-estimating member 60 suitable for the arrangement according to the invention. It includes first of all a Fourier transformer 110 which at its plurality of outputs S1, S2, ... Sn produces signals representing the frequency components of the signal z(t). These composite signals are added together in the accumulators $112_1, 112_2, \ldots 112_n$ which produce a sum signal of a given number of composite signals recently processed by the transformer 110. A comparator assembly 120 compares pairwise the output signals of the accumulators 112. On the basis of the information components supplied by the assembly 120, a logic circuit 122 produces a closing signal for one of the on/off switches $125_1, 125_2, \ldots 125_n$. Thus, the signal having the highest amplitude determines, after having been detected as such by the assembly 120 and the circuit 122, closure of one of these on/off switches. These on/off switches make it possible to include the bandpass filters $130_1, 130_2, \ldots, 130_n$ which have for their object to filter the signal z(t). The output signal of the filter, when the on/off switch connected to it is closed, is applied to a zero-crossing detector 140. The output signal of this detector is applied to a counter 150 which is connected as a frequency meter. The output information taken in parallel from this counter determines the frequency of the signal z(t), and is employed by the member 62 for supplying V utilizing the formula (4).

Figure 9:
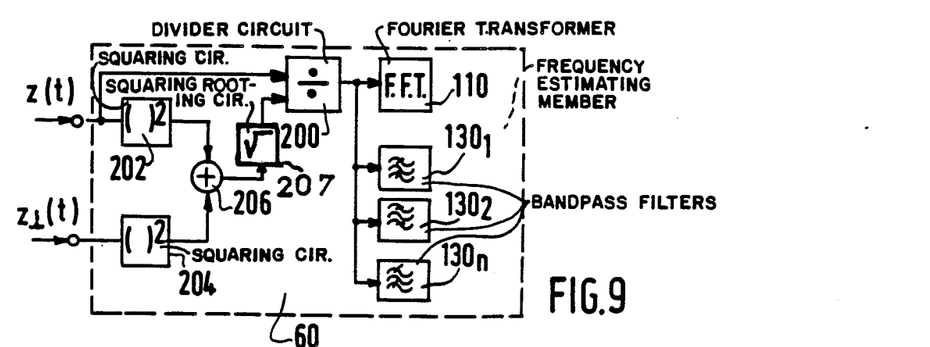

FIG. 9 shows the manner in which the frequency estimating member 60 shown in FIG. 8 is modified for enabling it to adapt itself to the pair of signals z(t) and z⊥(t). In FIG. 9, the signal z(t) is applied to a divider circuit 200 and also to a squaring circuit denoted by reference numeral 202, whilst the signal z⊥(t) is only applied to a squaring circuit 204 having the same function as the circuit 202. The output signals of the circuits 202 and 204 are applied to a summing member 206. The output signal of the member 206 is applied to the divider circuit 200 after having been passed through a square-rooting circuit 207. The output signal of this divider circuit is applied to the transformer 110 and to the filters $130_1, 130_2, \ldots, 130_n$. The remaining portion of the member 60 is identical to the member described with reference to FIG. 8. It should be noted that the signal at the output of the divider 200 can be written:

$$k\cos(\Omega t + \phi)/[k^2\cos^2(\Omega t + \phi) +$$

$$k^2\sin^2(\Omega t + \phi)]^{\frac{1}{2}} = \cos(\Omega t + \phi)$$

the amplitude of the signal is then normalized.

Figure 10:
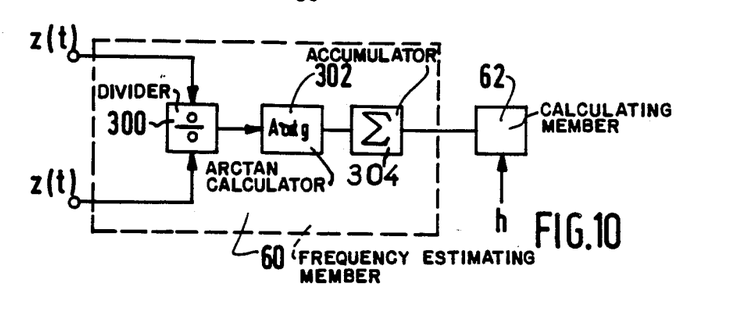

A different manner of processing the signals z(t) and z⊥(t) is shown in FIG. 10. A divider 300 dividing the signal z⊥(t) by the signal z(t) produces a signal of the form tan (Ωt+φ) so that an Arctan calculator 302 supplies an indication about the frequency Ω. Before this signal is applied to the member 62, a summing operation is effected by the accumulator 304 of the last results produced by the calculator 302.

Figure 11:
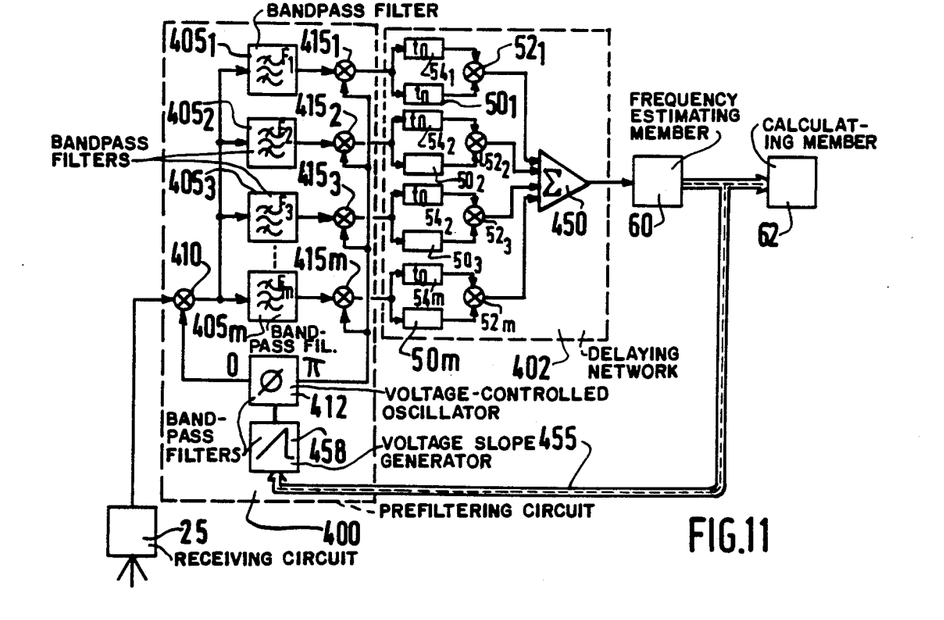
FIG. 11 shows the structure of a prefiltering circuit.

FIG. 11 illustrates an arrangement according to the invention in which, in addition, a prefiltering circuit 400 is provided upstream of the frequency estimating member 60. The presence of this prefiltering circuit requires in addition a network of direct and delaying branches 402 connected to its outputs. The input of this prefiltering circuit is connected to the output of the receiving circuit 25. It is assembled from a series of "m" bandpass filters $405_1$, $405_2$, $405_3$, ..., $405_m$ for the respective frequencies $F_1$, $F_2$, $F_3$, ..., $F_m$. The inputs of all these filters are connected to the output of a mixer circuit 410, which has two inputs one of which is connected to the output of the receiving circuit 25 and the other to the output O of a voltage controlled oscillator 412.

Figure 12:
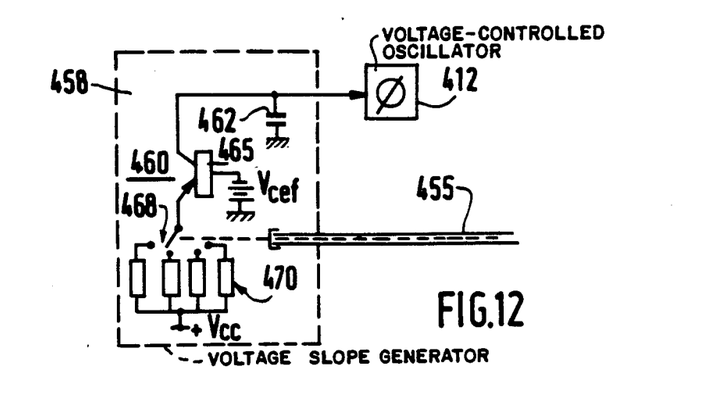
FIG. 12 shows the structure of an element forming part of the prefiltering circuit.

Each output of the filters $405_1$, $405_2$, $405_3$, ... $405_m$ is connected to the input of a dual-input mixer circuit $415_1$, $415_2$, $415_3$, ... $415_m$. The other input of these last-mentioned mixer circuits is connected to the output $\pi$ of the oscillator 412. The phases of the signals at the outputs O and $\pi$ of this oscillator 412 are shifted through 180°. A direct branch and a delaying branch of the network 402 is connected to the output of each of these mixer circuits $415_1$, $415_2$, $415_3$ ... $415_m$. These branches have been given the following reference numerals:

| | |
|---|---|
| $50_1$ and $54_1$ | for the branches connected to the output of the mixer circuit $415_1$, |
| $50_2$ and $54_2$ m | for the branches connected to the output of the mixer circuit $415_2$, |
| $50_3$ and $54_3$ | for the branches connected to the output of the mixer circuit $415_3$, |
| . | . |
| . | . |
| . | . |
| $50_m$ and $54_m$ | for the branches connected to the output of the mixer circuit $415_m$, | and these branches are connected respectively to two inputs of the mixer circuits $52_1$, $52_2$, $52_3$, ..., $52_m$, whose outputs are connected to a summing circuit 450. The output of this circuit 450 constitutes the output of the branch network 402. The prefiltering circuit 400 cooperates with the frequency estimating member. For that purpose a connection 455 is provided between the output of this member and the oscillator 412. A voltage slope generator 458 which applies its output voltage to the voltage-controlled oscillator 412 is responsive to this connection. This generator is shown in detail in FIG. 12. It is predominantly formed by on the one hand a current generator 460 which is programmable by the information conveyed via a connection 455 and on the other hand by a capacitor 462; the voltage at its plates is applied to the voltage controlled oscillator 412. The current generator 460 is constituted by a transistor 465 whose base receives a fixed voltage $V_{ref}$ and whose emitter is connected to a resistor network 470 via a change-over switch 468. The digital information conveyed via the line 455 is used to switch the change-over switch 468 and consequently to define the value of the current flow of the generator 460. The components of this slope generator 458 are chosen such that the signal SV at the output O of the oscillator 412 is written as:

$$SV = k_v \sin(\omega_f + \hat{\Omega}t)t + \phi'$$

wherein $k_v$, $\omega_f$ and $\phi'$ are constants, $\hat{\Omega}$ being derived from the value $\Omega$ estimated by the member 60.

To explain the mode of operation of this prefiltering circuit 400 reference is made to FIG. 13; in this FIG. 13, from a to d, the signals in a frequency-time domain are shown, of the same type as those shown at a in FIG. 3.

At a in the FIG. 13 three lines TR1, TR2 and TR3 are shown which correspond to the input signals of the prefiltering circuit 400.

Figure 13A:
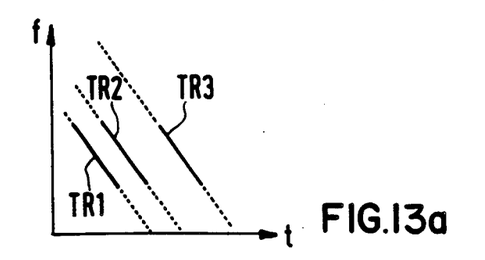
FIGS. 13a, 13b, 13c and 13d are diagrams illustrating the mode of operation of the prefiltering circuit of FIG. 11.
Figure 13B:
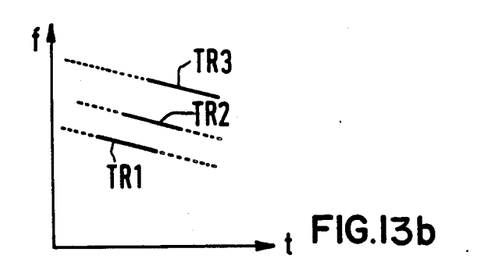
Figure 13C:
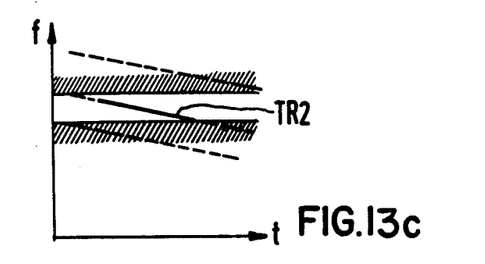
Figure 13D:
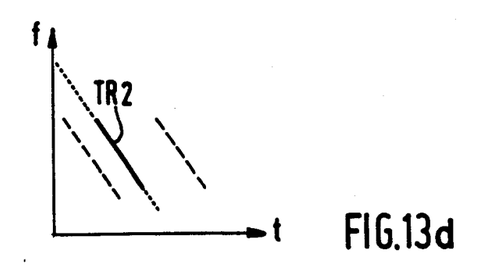

Let it be assumed that only the line TR2 contributes to determining $\Omega$, that is to say that the other lines relate to other signals which do not develop in the same way as the signal corresponding to TR2. After having passed through the modulator 410, the different lines have become quasi-horizontal. In theory, the line TR2, for example, might be horizontal if the velocity V is estimated accurately or does not change between the instant at which the value $\Omega$ is determined by the member 60 and the instant at which the signal corresponding to TR2 is received. At, for example, the output of $405_2$ the other signals defined by TR1 and TR3 will not be transmitted by this filter, similarly $405_3$ will only transmit TR2 as the frequencies TR1, TR2, TR3... are appropriately spaced apart. This is shown at c in FIG. 13 for TR2. Then reference d of FIG. 13 indicates that, for example, only the signal defined by TR2 will be outputted by $405_2$, the other signals then having been cancelled.

Such a prefiltering circuit 400 can be adapted to quadrature signals, namely: R(t) and R⊥(t), these signals being processed by the receiving circuit 25 (see FIG. 5).

Figure 14:
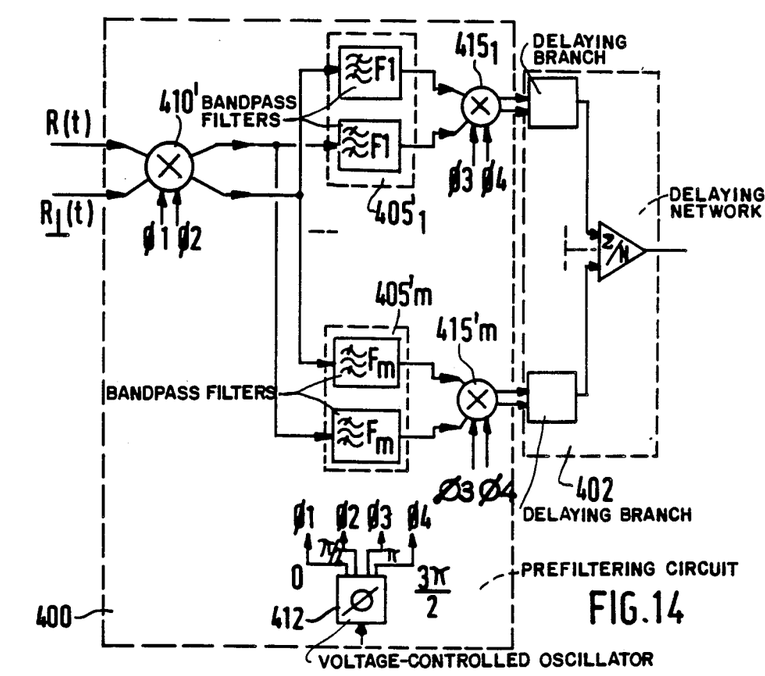
FIG. 14 shows the structure of a prefiltering circuit for quadrature signals.

For that purpose, the mixer circuits 410', $415'_1$, $415'_m$, which correspond to mixers 410, $415_1$ ... $415_m$, have a structure as shown in FIG. 14. The filters $405'_1$ ... $405'_m$ are split so as to enable filtering of the two signals available at the output of the mixer circuit 410'. The branch network at the outputs of the mixer circuits may supply the branches 50 and 54 shown in, for example, FIG. 5. The oscillator 412 produces signals $\phi_1$, $\phi_2$, $\phi_3$, $\phi_4$ whose phases are shifted through 0°, 90°, 180° and 270°, respectively. The signal $\phi_1$ and $\phi_2$ are applied to the mixer circuit 410' and the signals $\phi_3$ and $\phi_4$ to the mixer circuits $415'_1$ ... $415'_m$.

Figure 15:
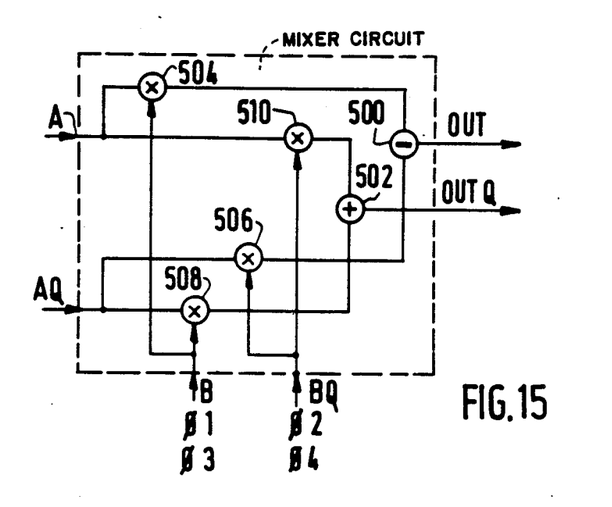
FIG. 15 shows a detail of an element forming part of the prefiltering circuit of FIG. 11.

The mixer circuits 410', $415'_1$, ... $415'_m$, a detail of which is shown in FIG. 15, have ports A and AQ for the signals to be processed and ports B and BQ for the mixed signals. The ports A and AQ receive the signals R(t) and R(t) for the mixer circuit 410' and the output signals of the filters $405'_1$ ... $405'_m$ for the mixer circuits $415'_1$, ... $415'_m$. The ports B and BO receive the signals $\phi_1$ and $\phi_2$ for the mixer circuit 410' and the signals $\phi_3$ and $\phi_4$ for the mixer circuits $415'_1$, ... $415'_m$. These mixer circuits have outputs OUT and OUTQ which are connected to inputs of the filters $405'_1$, ... $405'_m$ for the circuit 410' which inputs are connected to the branch network 402.

The output OUT is constituted by the output of a subtracting member 500 and the outpt OUTQ is constituted by the output of a summing member 502. A first input of the member 500 is connected to the output of an elementary mixer circuit 504 and a second input of this same member 500 is connected to the output of a second elementary mixer circuit 506. A first input of the member 502 is connected to the output of a third elementary mixer circuit 508, a further input to the output of a fourth mixer circuit 510. The input B is connected to an input of the mixer circuit 504 and 508, the input BQ to an input of the mixer circuit 506 and 510. The input A is connected to the other input of the mixer circuit 504 and 510 and the input AQ is connected to the other input of the mixer circuits 506 and 508.

Figure 16:
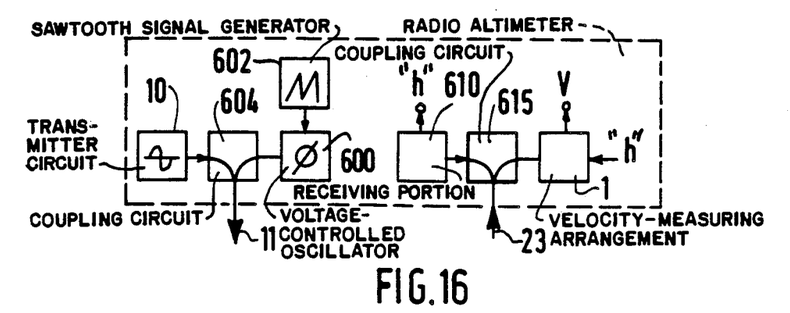
FIG. 16 shows the cooperation between a radio altimeter and an arrangement according to the invention.

An arrangement according to the invention shown in FIG. 16 includes means for producing the value "h". In the example in which the arrangement is used for radio navigation, these means are constituted by a radio altimeter of the linear frequency modulation type; for this subject reference is made to French Patent Specification No. 1,557.670(corresponding to U.S. Pat. No. 3,588,899). This radio altimeter includes a transmission portion formed by an oscillator 600 whose frequency is linearly modulated by a sawtooth signal generator 602. A coupling circuit 604 renders it possible for the antenna 11 to simultaneously transmit the signals produced by the transmitter circuit 10 and the oscillator 600. The receiving portion 610 of the radio altimeter is connected to the output of a coupling circuit 615. This renders it possible to use the same antenna 23 for the rate measuring arrangement and for the radio altimeter. The value "h" established by the receiving portion 610 renders it possible to define the velocity V in accordance with the formula (4).

Figure 17:
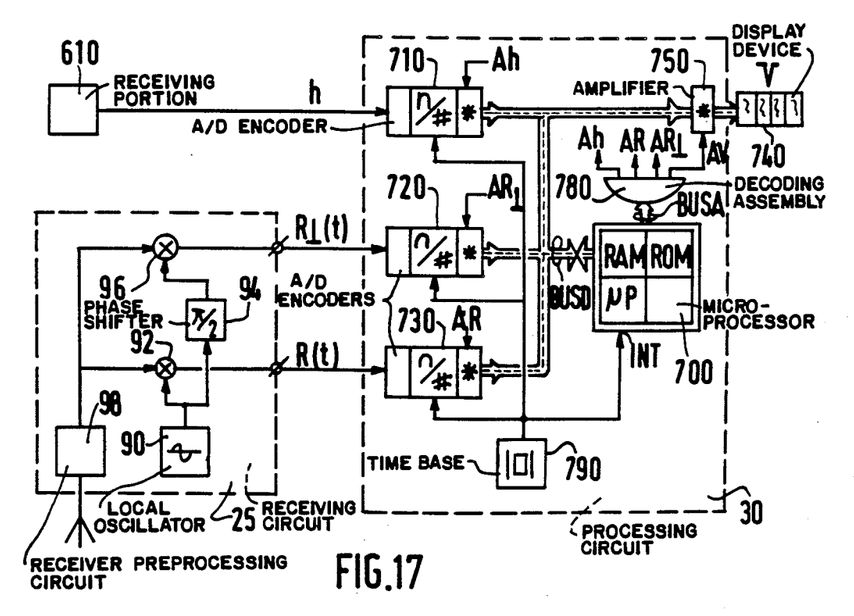
FIG. 17 illustrates a preferred circuit diagram of an arrangement according to the invention.

FIG. 17 shows a preferred embodiment of the invention. For this example the receiving circuit 25 is used which produces the signals $R(t)$ and $R\perp(t)$ and the receiving portion 610 of a radio altimeter of the type as described with reference to FIG. 16 and which produces the value "h" in the analogue digital form or, as described in the above-mentioned Patent Specification, this value "h" may alternatively be shown in digital form. The signals h, $R(t)$ and $R\perp(t)$ are applied to the processing circuit 30 constituted by a microprocessor assembly 700. This assembly is formed in the most conventional form by a microprocessor (for example the TMS 320 produced by TEXAS INSTRUMENTS), a random access memory and a ROM memory for containing the instructions which manage the mode of operation of the microprocessor and also for containing different useful constants for this mode of operation. This assembly communicates with the exterior via the data line BUSD and the line for addressing codes BUSA and here the input INT is utilized which, when a signal of an appropriate logic value is applied thereto, can bring about an interrupt (masked interrupt). The line BUSD is connected to the output of three analogue-digital encoder assemblies 710, 720 and 730. These assemblies are each constituted by a sampler-blocking device, an analogue-digital converter and a three-stage amplifier. For analogue "h" the assembly 710 is used for encoding "h", the assembly 720 for encoding R (t) and the assembly 730 for encoding R (t). The line BUSD is also connected to a display device 740 via a three-stage amplifier arrangement 750. A decoding assembly 780 connected to the line BUSA renders it possible to select the assembly 710, 720, 730 and 750 by having an active signal appear on one of the lines AH, AR⊥, AR and AV. A time base 790 applies signals to the assembly 710, 720 and 730 for determining the sampling periods of the quantities $R\perp(t)$ and $R(t)$. Although the signal "h" is sampled at the same frequency, one single sample out of a number of samples NMAX will be considered, as will be explained in the sequel. The time base signals are also applied to the input INT of the assembly 700.

Figure 18:
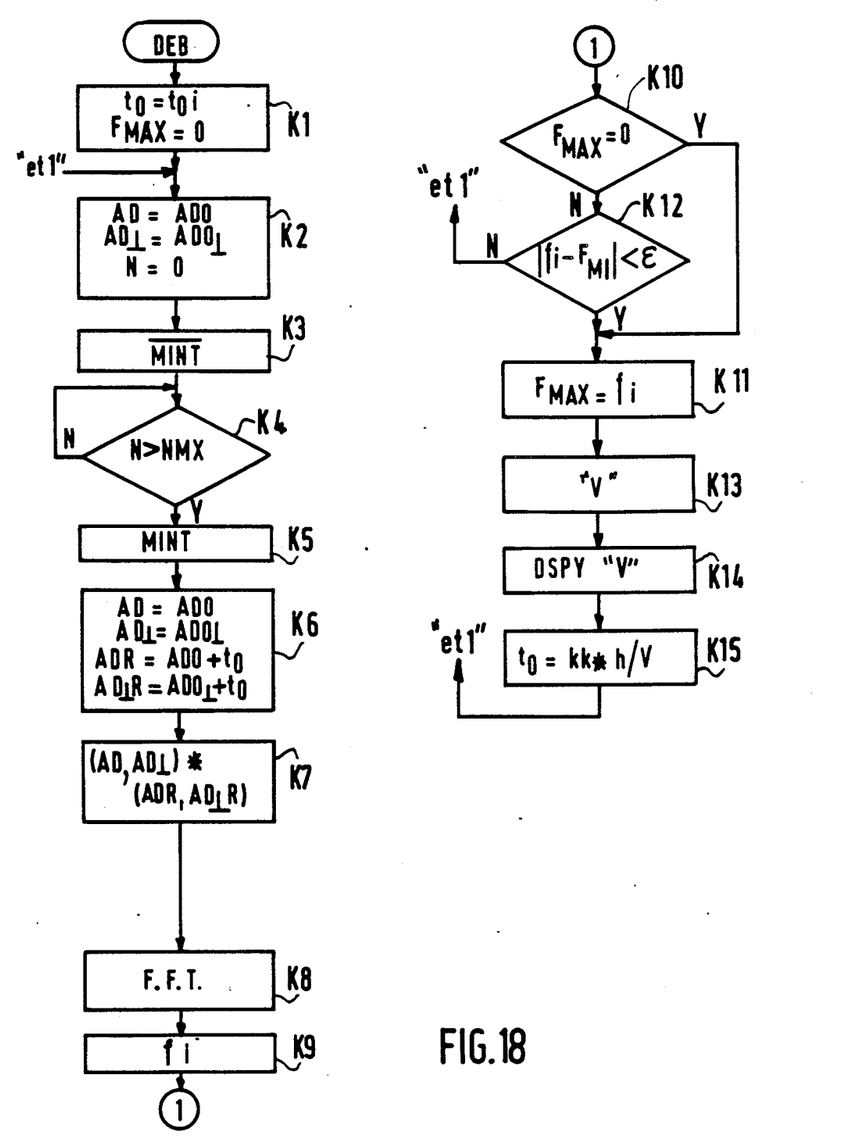
FIG. 18 is a flow chart showing the function program of the arrangement of FIG. 17.

The mode of operation of this preferred embodiment will now be described with reference to the flow charts shown in the FIGS. 18 and 19, which show the manner in which the continuous program in the ROM memory of the assembly 700 is realized.

The box referenced K1 shows the starting phase. There are two distinct values to be initialized: the first one is $t_0$ (representing the delay produced by the delaying branches) and the second is the value of the frequency where a maximum level value, i.e. $F_{MAX}$ is found. It will be obvious that here the memory address in which the values are arranged is not defined. The box K2 represents a starting phase for the memory pointers AD and AD⊥ intended to address the respective samples of $R(t)$ and $R\perp(t)$. Also a value N representing the number of the pairs of samples of $R(t)$ and $R\perp(t)$ are initialized. It should be noted that between the box K1 and the box K2 there is a program subroutine linkage point "et1". In box K3 the mask inhibition is represented, that is to say that any active signal at the input INT will cause the interrupt programm to be executed, whose flow chart is shown in FIG. 19. In the box K4 the value N is tested as long as it has not reached the assigned value NMX, the test is relooped so that the interrupts may cause the value N to develop. When the test is positive, one proceeds to the box K5 where the interrupt is masked, that is to say the active signals at the input INT will no longer cause an interrupt in the program flow. In box K6 the pointers AD and AD⊥ are again initialized and also two further pointers ADR and AD⊥R which are shifted from the first-mentioned pointers through a quantity depending on $t_0$. In box K7 a complex multiplication, corresponding to $$[R(t)+jR\perp(t)]\cdot[R(t-t_0)+jR\perp(t-t_0)]$$

is effected. The different complex results of the multiplication are thereafter stored in the memory, preferably in locations indicated by AD and AD⊥, increased by a value such that the results of the multiplication will not take the place of the samples already stored.

Thereafter the samples resulting from the multiplication are submitted to the fast Fourier transform indicated in box K8. For this fast Fourier transform operation reference is made to the document published by TEXAS INSTRUMENTS entitled SIGNAL PROCESSING WITH THE TMS 320, more specifically to the article on page 21 "Signal-processing $\mu$C builds FFT band spectrum analyzer". Thereafter the frequency "$f_i$" is determined at which the maximum level is obtained (box K9).

In box K10 the contents of the value $F_{max}$ is tested: if it is equal to zero, which corresponds to the first frequency determination, the value $F_{max}$ will take the value "$f_i$", box K11; if the value $F_{max}$ is inequal to zero it is tested (box K12) if the value "$f_i$" is compatible with the previously measured value, that is to say that, as indicated, the difference between these two values is taken and this difference is tested relative to a tolerance value $\epsilon$. If the test indicated in box K12 is negative, one proceeds to the programm branch point "et1". If the same test is positive, one proceeds to the box K11. In box K13 the value V is calculated in accordance with the formula (4) already indicated, thereafter this value is displayed (box K14) on the display device 740. Finally, so as to ensure that the operation is appropriately adapted to the different velocities and to the different altitudes "h", the value $t_0$ is corrected in accordance with the formula indicated in box K15. That is to say $t_0=(kk\cdot h)/V$ wherein kk is a constant. Thereafter one returns to the program branch point "et1".

Figure 19:
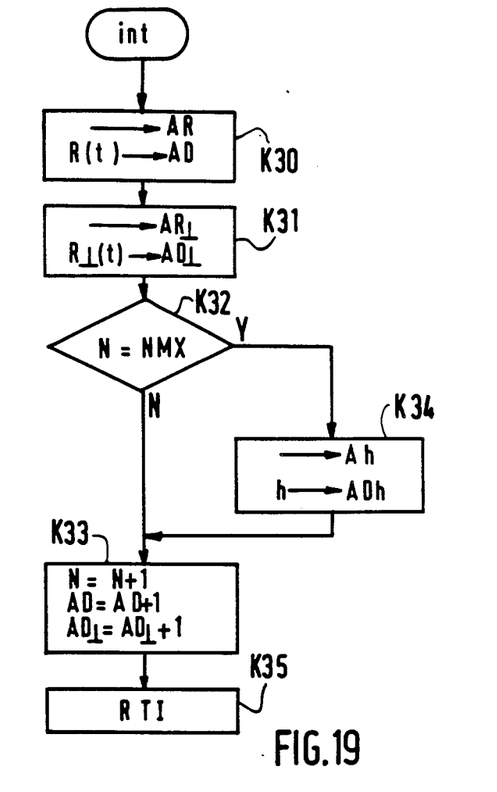
FIG. 19 is a flow chart showing the interrupt program for the arrangement of FIG. 17.

The flow chart of FIG. 19 shows how the interrupt program is realized. Box K30 indicates the manner in which the sample $R(t)$ is taken (the signal AR is activated) and how it is stored in the memory in a location indicated by the pointer AD. The box K31 indicates the same operations for the sample $R\perp(t)$: activation of the signals AR⊥ and storing by the pointer AD⊥; in box K32 it is tested whether it has the value NMX; if no, one proceeds to box K33 wherein the values are incremented by N and by the contents of the pointers AD and AD⊥. If the value $N=NMX$, one proceeds to the box K34 where the value of "h" is loaded by activating "h" and the value is stored in an address ADh. Box K35 indicates the return to the main program whose flow chart is shown in FIG. 18.

By way of illustration, the value of some parameters are now given.

The frequency $f_i$ of the oscillator 94 is chosen such that the frequency of the signal at the output of the receiver circuit is between 100 Hz and 10 kHz. The frequency of the time base 790 is 20 kHz.

$t_{0i} = 5$ ms $\lambda = 4$ cm $NMX = 1024$

The Fourier transform is a 1024 bit transformer.

What is claimed is:

1. An arrangement for measuring the velocity with respect to a surface at a distance h therefrom, said arrangement comprising transmitting means for directing a wave toward the surface, receiving means for receiving the wave returned by the surface and for producing a receiver signal representative thereof, and a circuit for processing the receiver signal and producing a signal representative of the velocity,
    characterized in that the transmitting means comprises a fixed frequency oscillator and a transmitting antenna, the receiving means comprises a single receiving antenna and a receiver circuit, and the processing circuit comprises:
    (a) a multiplying member having first and second inputs and an output;
    (b) first and second signal-carrying branches electrically connected to the receiving means, the first branch comprising a direct branch for applying the receiver signal to the first input of the multiplier member and the second branch comprising a delaying branch for applying the receiver signal to the second input of the multiplying member after having been subject to a delay $t_0$ relative to the direct branch;
    (c) a member electrically connected to the output of the multiplying member for estimating the frequency of the multiplying member output signal; and
    (d) a calculating member electrically connected to the estimating member for producing the signal representative of the velocity and the distance h.

2. An arrangement as claimed in claim 1, characterized in that the direct branch comprises a direct connection and in that the delaying branch comprises by a delay member.

3. An arrangement as claimed in claim 1, characterized in that the direct branch comprises a direct connection and in that the delaying branch comprises a cascade arrangement comprising a delay element and a fixed frequency shift member for adding a frequency value to the frequency of the receiver signal.

4. An arrangement as claimed in claim 1, characterized in that the direct branch comprises a fixed frequency shift member for adding a frequency value to the frequency of the receiving signal and in that the delaying branch comprises a delaying member.

5. An arrangement as claimed in claims 1, 2, 3 or 4 characterized in that it is furthermore provided with a prefiltering circuit arranged between the output of the receiving circuit and the frequency estimating member, said prefiltering circuit comprising an input modulator for reducing the frequency variations of the output signal of said receiving circuit, a bandpass filter bank and an output modulator for reestablishing said frequency variation, the direct and delaying branches being arranged in a network for connection to the output of each of the bandpass filters.

6. An arrangement as claimed in claims 1, 2, 3 or 4 characterized in that the frequency estimating member comprises a Fourier transformer.

7. An arrangement as claimed in claim 1, 2, 3 or 4 characterized in that the estimating member comprises a Fourier transformer for cooperation with a counter arranged as a frequency meter and for controlling filtering of the signals applied to this counter.

8. An arrangement as claimed in claim 6, for which the signals applied to the estimating member are formed from two quadrature signals, characterized in that the estimating member comprises a normalization circuit provided upstream of the Fourier transformer and including a divider for dividing the quadrature signals by a signal representing the sum of the squares of the two quadrature signals.

9. An arrangement as claimed in claim 1, 2, 3 or 4 where the signals applied to the estimating member are formed from two quadrature signals, characterized in that the estimating member comprises a divider for dividing one of the quadrature signals by the other quadrature signal and a Arctan calculating circuit.

10. An arrangement as claimed in claims 1, 2, 3 or 4 characterized in that means are provided for adjusting the value $t_0$ of the delaying branch versus the values V.

11. An arrangement as in claim 1, 2, 3 or 4, characterized in that said arrangement includes a means for establishing the value h, said means comprising a radioaltimeter including a transmission portion and a receiving portion, and in that said arrangement further comprises a coupling circuit for electrically connecting the transmitting antenna to the fixed frequency oscillator and said transmission portion, and for electrically connecting the receiving antenna to the receiver circuit and said receiving portion.

12. An arrangement as in claim 1 where said processing circuit comprises a microprocessor having inputs for receiving the receiver signal and a signal representing the value h, means for transforming said signals into digital samples, and an output for providing a signal representative of the velocity, characterized in that the processing circuit is adapted to produce the signal representative of velocity by:
    (a) storing the samples in a memory;
    (b) multiplying a sample located in a first address by another sample located in a second address, the two addresses being shifted by a value $t_0$;
    (c) arranging in the memory the samples obtained from the multiplying operation;
    (d) analyzing the multiplication samples by Fourier transform to determine the velocity V;
    (e) applying the value V to the output means; and
    (f) readjusting the value $t_0$ and returning to step (a).

* * * * *